Nov. 24, 1970         E. B. DAHLIN         3,543,010
COEFFICIENT TUNING METHODS FOR PROCESS CONTROL SYSTEMS
Filed Dec. 7, 1966                         2 Sheets-Sheet 1

INVENTOR.
ERIK BJORN DAHLIN

BY
ATTORNEY

3,543,010
COEFFICIENT TUNING METHODS FOR PROCESS CONTROL SYSTEMS
Erik Bjorn Dahlin, Saratoga, Calif., assignor to International Business Machines Corporation, Armonk, N.Y., a corporation of New York
Filed Dec. 7, 1966, Ser. No. 599,879
Int. Cl. G05b 15/00, 23/00, 11/01
U.S. Cl. 235—151.1                                                5 Claims

ABSTRACT OF THE DISCLOSURE

Method of process control wherein controller gain coefficients are generated by a tuning operation. An operator may adjust only a single process variable, the process noise cutoff frequency. The subject method responds to this adjustment and to signals representing the values of identified process parameters to generate signals representative of controller gain coefficients. Control signals are then generated and operate the controller in accordance with the controller gain coefficients to thereby adjust a controlled variable of the process in response to the control signals.

---

The present invention relates to process control systems and, more particularly, it relates to an improved method of tuning automatic control systems.

The art and science of regulating physical processes with automatic control equipment is becoming of more importance as the use of that equipment becomes widespread. Automatic controllers are generally of two types; the digital, or sampled data type, and the analog controller. Both types of controllers are generally categorized by the number and type of adjustable parameters built into the controller. For example, a particular analog or digital controller may be of the proportional-integral type (commonly referred to as a two-mode controller). Such a controller has two parts or sections each of which has an adjustable parameter, or gain, associated therewith; namely, the proportional gain and the integral gain. Each part, or section, of the controller is responsive to measurements of the current and past errors of controlled variables (i.e., deviations from a setpoint), but each is responsive in a different manner. The proportional part of the controller makes the controller output respond in proportion to the present error signal. The integral part of the controller provides an additional contribution to the controller output from the integral of all past errors; in a sampled data system, it would be the sum of all past errors. The stability, as well as the effectiveness, of the control loop in maintaining accurate regulation of the controlled variable depends upon the selection of the gains which are associated with each part of the controller. The best combination of gains for one application may, or may not, be the best combination for a second application. The task of assigning values to the various gains in a controller is known as tuning the controller.

The technique of tuning automatic controllers is generally regarded as an art rather than a science. Stated differently, the known techniques for tuning automatic controllers generally involve a substantial amount of judgment on the part of the process operator. In a conventional analog three-mode controller, there are three gains that the operator must adjust in order to obtain the correct system response. Generally, the operator will set the gains and then observe the system operating. If the system does not operate as desired, he must reset the gains (i.e., readjust certain knobs) until the desired response is obtained. A primary difficulty here is that the effects produced by turning the knobs are inter-dependent; that is, the effects produced by turning each knob or adjusting each gain depends to some extent on the setting of the other knobs or gains. This situation is made even more complicated when interacting control loops (that is, a number of controllers operating to control a number of inter-related control loops) are present, since the best adjustment of one controller depends on the settings of the coefficients in the other controllers. Thus, it can be seen that tuning a controller is an art that involves much judgment.

A digital controller may have the same three adjustable gains as the three-mode analog controller just mentioned. However, in many applications it is advantageous to utilize many more parameters to achieve higher accuracy control. These parameters must also be tuned.

Although those situations where a digital computer performs the complete control function are very effective, it is generally still necessary to have an operator-controlled tuning input. For example, should the process output rise rapidly in amplitude, one requires a control operation other than merely removing all control; that has been necessary sometimes in the past.

Accordingly, it is a general object of this invention to provide an improved method for tuning a closed loop control system.

A more particular object of this invention is to provide an improved method of tuning a multiparameter controller used in a closed loop control system, wherein the tuning requires adjusting only a single coefficient.

Another object of this invention is to provide an improved method of tuning a multiparameter controller used in a closed loop control system wherein the tuning requires adjusting only a single coefficient and that coefficient defines a property of the closed control loop.

Another object of this invention is to provide an improved method of tuning a controller wherein the noise cutoff frequency of the control system is employed.

Yet another object of this invention is to provide an improved method of controlling a process wherein a plurality of parameter values supplied by a process identification method are used in conjunction with a single additional coefficient to tune controller gain parameters for a particular closed loop characteristic.

Yet another object of this invention is to provide an improved method of controlling a process of the type set forth immediately above wherein the control signals have been filtered.

Yet another object of this invention is to provide an improved method of tuning automatic controllers wherein the controller may be either digital or analog in nature.

A further object of this invention is to provide an improved method of tuning multimode controllers for the closed loop control of a papermaking machine.

Still another object of this invention is to provide an improved method of tuning a controller wherein several controllers are arranged in cascade connection; in parallel connection; or in a combination of cascade-parallel connection.

My invention includes a new method of inter-relating measured and calculated variables in a process. It involves taking a series of physical measurements, performing certain mathematical operations on the values obtained by these measurements, and then adjusting certain variables in accordance with the results obtained from the computation. The computer program for performing the computation is not my invention. My invention is a control technique or, more explicitly, my invention is a method of adjusting the setting of a process variable in accordance with signals obtained from the process being controlled.

Briefly stated, then, my invention comprises a novel method of tuning a controller wherein signals representing gains of an analog controller, or control algorithm coefficients in a digital controller, are generated. These signals are generated in response to two other types of signals; namely, signals representing identified parameter values for the process under control and a signal representing a manually tuned coefficient. An important aspect of the invention is that there is only one manually tunable coefficient and this coefficient bears an easily identifiable relationship to the closed loop response of the system. In particular, the manually tunable coefficient (herein called $\lambda$), may be the noise cutoff frequency of the loop being controlled.

In accordance with the first step of my invention, signals representing the identified process parameter values are obtained from a current identification operation, or stored values of a previous identification operation may be used. In this same step, the value of the manually tunable coefficient (herein called $\lambda$) is also supplied. Next, signals are generated representing controller gain parameter(s) as a specific function of the identified parameter values and of $\lambda$. The controller gain signals are then supplied to a controller which adjusts the process according to the new values of the parameter in its control law and in accordance with the presently measured value of the variable under control.

New values of $\lambda$ may, for example, be supplied by electronic hardware that is available to the process operator. In that embodiment of my invention employing the noted hardware for generating the $\lambda$ signal, the operator must first inspect a graphical display device, such as a recorder plotting control signal values as a function of time. (Alternatively, this recorder can display a process variable which is closely associated with the controller output signal.) Generally, there is a permissible range of variation of the displayed variable for short term regulatory purposes. The operator then adjusts $\lambda$ to maintain that variable within the range as will be described more fully.

My invention presents, for the first time, a method of tuning controllers wherein only a single parameter need be adjusted by an operator in order to bring about simultaneous changes in associated controller coefficients. Gone are the tedious and time consuming operations of the prior art wherein it was necessary to first adjust one parameter, observe the effects of that on a plurality of controller coefficients; adjust a second parameter, observe the effects of that on the same plurality of controller coefficients; then, perhaps, try to adjust parameters one and two simultaneously and observe the effects of that on controller coefficients; etc. Now, a human operator can look at a simple recorder or other graphical display device, note the variations in a control signal or single process parameter (controlled variable) and turn a single knob so as to adjust a single parameter, thereby effecting uniform adjustment in a plurality of controller coefficients. To do this, it is necessary to provide merely the input from that single knob as well as parameter values obtained from a prior process identification operation.

The observations made by the human operator need not require a detailed knowledge of either mathematics, science or even of the process itself. A predetermined range can be determined for the output signals monitored by the operator, and he need only keep those output signals within that range. Even occasional deviation from that range will not seriously diminish the effectiveness of this tuning method.

The improved method of tuning controllers finds particular application for computer-controlled process. Since process identification is necessary, an associated computing apparatus can be used to identify process parameter values rapidly and certainly, or alternatively to store standard values of the identified parameters and make them available as needed. Those identified values are then supplied to the tuner and with a simple manual adjustment of $\lambda$ made by the human operator, tuned values of controller gain coefficients are then generated.

As additional advantages, it should be noted that the novel method of this invention applies with the same facility to a plurality of interconnected controllers as it does to a single controller operating alone. It also has shown special attractiveness when applied in closed loop control of papermaking machines where moisture and basis weight probes are scanning across the paper sheet. That application has been difficult to control in the past.

It is also worthy of note that the novel method of my invention can be applied to feed forward control. That is the control operation where a controller compensates for a change in an input variable so that the change is never reflected in an output variable. Feed forward control requires tuning as well, and my invention can be applied here.

Cascade control systems are extremely simple to tune by this method due to the fact that the adjustable parameter for each loop is the noise cutoff frequency.

Also, the selection of the noise cutoff frequency as the adjustable parameter permits the control loop to be adjusted for different efficiency of noise suppression while assuring that the response to setpoint changes is free from overshoot.

The foregoing and other objects, features and advantages of my invention will be apparent from the following more particular description of a preferred embodiment of the invention as illustrated in the acompanying drawings.

In the drawings:

FIG. 2 is amplified herein by reading it in conjunction with the detailed description of my invention;

Figure 1:
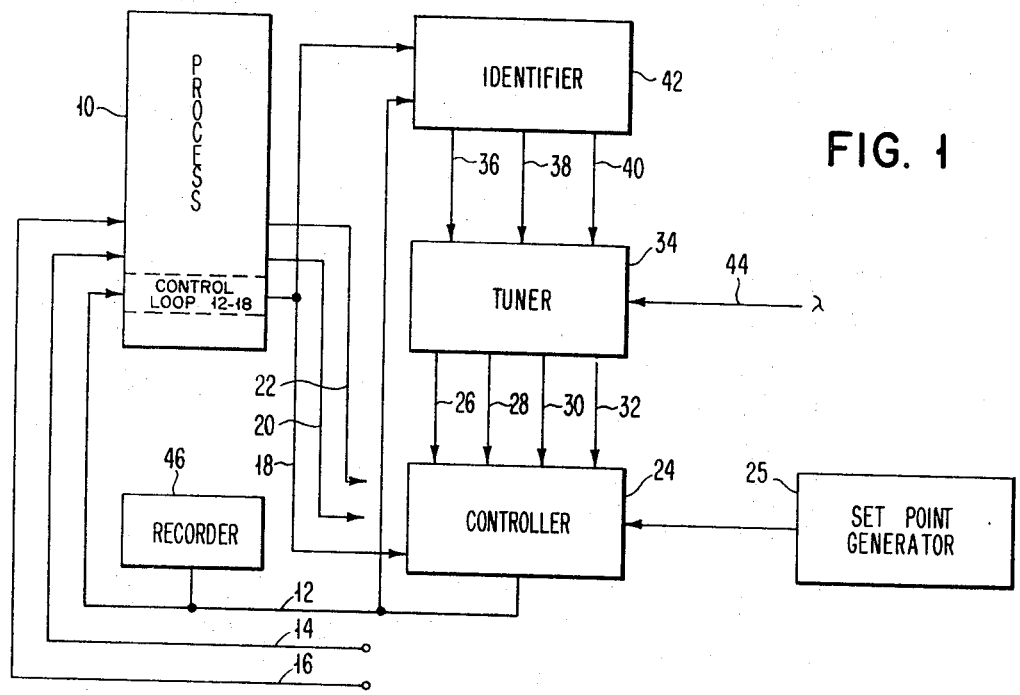
FIG. 1 shows in block diagram form a process and typical associated apparatus for practicing the novel method of my invention.

FIG. 1 shows a general layout of typical equipment for practicing the novel method of my invention. A physical process 10, such as a Fourdrinier papermaking machine, is characterized by input and output variables (or manipulated and controlled variables). Process input variables are adjusted by signals on lines 12, 14, 16 from associated controllers only one of which, controller 24, is shown for clarity. Signals which indicate the value of the process output variables are present on a plurality of lines 18, 20, 22 and these are provided to associated controllers. In an actual process, there may be more or fewer lines present than those noted in FIG. 1. For the purpose of illustrating the present invention, attention will be concentrated on that part of process 10 which is controlled by signals on line 12 and which generates output signals on line 18. This part of the process will hereinafter be termed control loop 12–18. The value of the signal on line 12 is set by an associated controller 24 which receives a setpoint signal for control loop 12–18 from setpoint generator 25 and a controlled variable signal on line 18. In order for a controller 24 to regulate control loop 12–18 in an optimum manner, the gain values for controller 24 must be adjusted to reflect the current state of process 10. Appropriate gain values for controller 24 are supplied for example on lines 26, 28, 30, 32 and they represent coefficients for the control law in controller 24; these coefficients are generated by a tuner 34. Tuner 34 in turn receives signals on lines 36, 38, 40 representing identified parameter values for control loop 12–18; these identified parameter values are made available from identifier 42. In addition, tuner 34 receives an operator controlled coefficient on line 44; that coefficient is referred to herein as lambda $\lambda$ and will be made clearer subsequently. The $\lambda$ coefficient on line 44 is set by the operator in response to a display of a particular manipulated variable fluctuation on a graphical display device such as strip chart recorder 46. In response to the $\lambda$ signal on line 44 and the identified parameter values on lines 36, 38, 40, tuner 34 generates a plurality of signals representing control law coefficients on lines 26, 28, 30, 32. These signals are then provided to controller 24 so that it can regulate control loop 12–18, in this example, in accordance with the most current condition of control loop 12–18. It should be noted at this point that what has been said about control loop 12–18 applies with equal truth to other control loops not shown in process 10. There would be separate adjustable $\lambda$ coefficients for each such loop. Each $\lambda$ coefficient could be individually adjustable or they could be tied into one master adjustment.

Each element 24, 34, 42 could be a separate general purpose digital computer, a separate special purpose digital computer, a separate analog computer, or the steps performed by each of these elements could be performed by a single computer. The present invention involves the specific steps that are performed and not the apparatus for performing the steps. If process 10, or more particularly control loop 12–18, operated slowly enough, all of the steps to be described could be performed manually. Since the specification of particular apparatus is not relevant to the present invention, and since many different types of apparatus (as well as hand operations) could be used, a detailed explanation of particular apparatus for performing my invention will not be presented.

Figure 2:
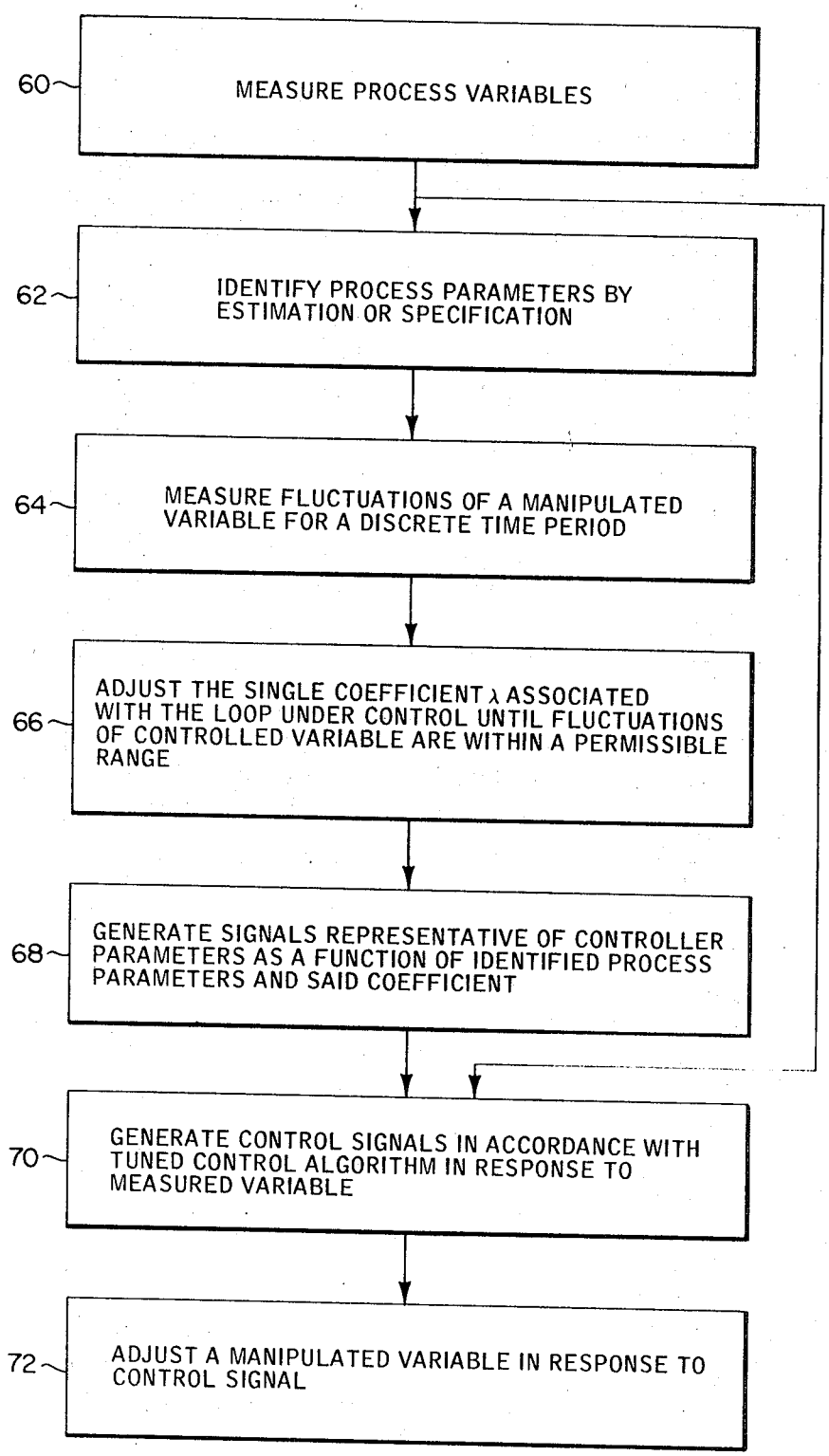
FIG. 2 shows, in outline form, the steps present in the novel method of my invention.

FIG. 1 thus shows a functional block diagram of apparatus which can be used to practice the novel method of my invention. The flow chart of FIG. 2 outlines the basic steps in practicing the novel method of my invention. The method as shown in FIG. 2 is presented in general terms applicable to many different processes. It will, however, be presented in more detailed terms with reference to a specific example of calculating coefficients for a specific control algorithm in response to a specific set of identified parameter values and a specific $\lambda$ coefficient.

With more particular reference to FIG. 2, the novel method of my invention, as noted, comprises tuning a controller so as to supply its control algorithm with coefficients representing the condition of the process 10, or control loop 12–18. In order to accomplish this, box 60 shows the measurement of process variables as an initial step. It is necessary to obtain a set of identified process parameters; either by estimation or specification. If estimation is used, the novel method of my copending application Ser. No. 599,878, "Parameter Identification Method For Process Control Systems," can be employed with success. If specification is used, a knowledge of the process can be used to select with some degree of certainty the identified parameter values. This operation is noted in box 62 of FIG. 2.

Figure 4:
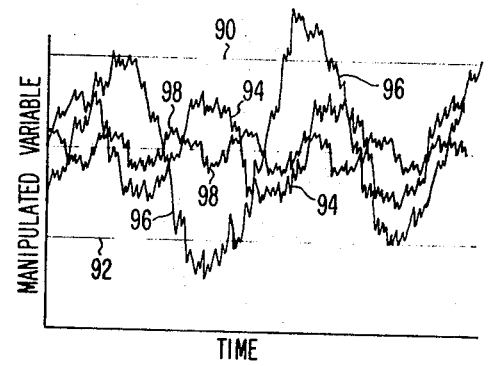
FIG. 4 shows a composite plot of controlled variable fluctuations of the type utilized in practicing the novel method of my invention.

Box 64 of FIG. 2 shows the step of measuring the fluctuations of a manipulated variable (such as signals on line 12) for a discrete time period. In practice, an operator inspects a graphical display device such as 46 of FIG. 1 showing a plot of the fluctuations of a manipulated variable against time (FIG. 4 shows such a plot in more detail). If these fluctuations are outside a predetermined range, then the operator must move to the step in box 66. The single coefficient $\lambda$ associated with this loop is adjusted until the fluctuations of the controlled variable are within a permissible range. The coefficient $\lambda$ could be adjusted in actual practice by varying a potentiometer so as to develop an analog signal. This is noted once again by observation on a graphical display device such as recorder 46. While $\lambda$ is being changed or adjusted, signals representing the controller parameters are also changing in response to the changed $\lambda$. All this while, the controller maintains control of process 10. As will be described more fully, mathematical relationships exist between the identified parameter values and the adjusted coefficient $\lambda$ enabling these controller parameters to be generated with a high degree of accuracy.

With continued reference to FIG. 2, box 70 shows the generation of control signals in response to the value of the measured variables and in accordance with a control algorithm that includes the last generated controller parameters. It is noted that controller 24 adjusts the value of the controller parameters in accordance with the present value of the measured variables either continually (in the case of an analog controller) or quite frequently (in the case of a sampled data system). On the other hand, identifier 42 and tuner 34 generally operate on a much slower cycle time so that controller 24 uses one set of parameters generated by tuner 34 to generate an entire sequence of signals on line 12. Finally, in box 72, the step of adjusting a manipulated variable by means of a signal, on line 12, in response to the control signal generated by controller 24, is set forth.

The noted description of the steps in my invention set forth immediately above was in outline form. A particular example of the tuning of certain coefficients for a particular control algorithm in response to particular identified parameter values is set forth immediately below.

As a particular example of the novel method of my invention, assume that control loop 12–18 can be represented by the model equation $$\frac{y(s)}{x(s)} = Ke^{-s\tau}\frac{A}{s+A} \quad (1)$$

where:

$y(s)$ = measured process output variables;
$x(s)$ = measured process input variables;
$K$ = process gain;
$e$ = the natural logarithmic base;
$s$ = the Laplace symbol;
$\tau$ = process transport delay;
$A$ = a process pole value.

Model Equation 1 is representative of, for example, an element of a Fourdrinier papermaking machine. Controller 24, regulating control loop 12–18, could effectively operate according to the following control algorithm (although it is not restricted to this law):

$$U_n = b_1 U_{n-1} - b_2 U_{n-2} + a_0 E_n + a_1 E_{n-1} \quad (2)$$

where:

$U_n$ = the new desired control signal generated on line 12;
$b_1$, $b_2$, $a_0$, $a_1$ are all coefficients in the control algorithm;
$E_n$ and $E_{n-1}$ are the current and immediately preceding values of an error signal generated for example by contrasting the signal present on line 18 to a setpoint value for that variable in control loop 12–18.

In order to practice the novel method of my invention, it is necessary to identify the parameter values present in model Equation 1, i.e., the parameter values $K$, $A$ and $\tau$. These identified parameter values can be obtained by using the novel method of my copending application IBM Docket 18333, "Parameter Identification Method for Process Control Systems," or they may be obtained by using standard values as noted earlier. With the aid of signals representing these identified parameter values and a signal representing the coefficient λ, which will be described more fully shortly, it has been discovered that each of the control algorithm coefficients $b_1$, $b_2$, $a_0$ and $a_1$ can be set as functions of K, A, τ and λ. With this knowledge, it is a simple matter to calculate the optimum tuned values for the noted control algorithm coefficients in accordance with the following formulas:

$$b_1 = -1 + \lambda T \quad (3)$$

$$b_2 = \lambda T \quad (4)$$

$$a_0 = \frac{\lambda}{KA} \quad (5)$$

$$a_1 = \frac{\lambda}{KA} \frac{\lambda}{(-1 + AT)} \quad (6)$$

where:

T = the sampling time or cycle time of controller 24.

It should be noted that the above Equations 3, 4, 5, 6 are true if $T/2 \leq \tau < 1.5T$. Once the tuned values of the control algorithm coefficients $b_1$, $b_2$, $a_0$, $a_1$ are obtained, they are used in the control algorithm expressed in Equation 2 and a control signal $U_n$ is generated on line 12 so as to set the manipulated variable in control loop 12–18 to its proper value.

Reviewing the novel method of my invention, it can be seen that a process, or a control loop, can be regulated in accordance with a control signal generated by a control algorithm having tuned coefficients best suited to the current condition of the control loop. These tuned coefficients are obtained in response to signals representing identified parameter values and a single coefficient; the latter coefficient λ can be adjusted by an operator. This relationship between identified parameter values and the tuned coeffcient can be applied to other, more complicated, control algorithms desirable for more complicated processes than that set forth in Equation 2 with equal accuracy and reliability.

In amplification of the above detailed example, note that model Equation 1 may be expressive of that element of an Fourdrinier papermaking machine directed to controlling basis weight. Similarly, control Equation 2 would work satisfactorily to control basis weight. If control loop 12–18 was directed to controlling basis weight the following table would give typical values for K, A, T, λ, $b_1$, $b_2$, $a_0$, $a_1$, $U_n$ and $E_n$.

```
T = 30
K = 5.0
A = .03
λ = .01
b₁ = —.7
b₂ = —.3
a₀ = .0667
a₁ = —.00667
Uₙ = 28
Eₙ = 0.4
```

It should be noted that the above example is merely illustrative. It is not represented that this data has been obtained from an actual process, or control loop of such a process, nor that the numerical values have been obtained through a rigorous mathematical exercise. However, the values are typical, or representative, of the magnitudes one would obtain through the novel method of this invention.

Figure 3:
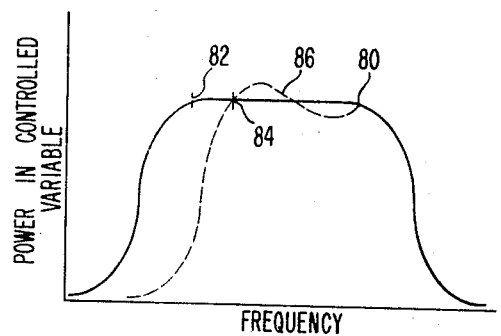
FIG. 3 shows graphically a power spectral density function of a controlled variable fluctuation.

FIG. 3 shows in graphical form what the coefficient λ truly represents. With reference to FIG. 3, the power in a controlled variable (such as basis weight in control loop 12–18) is plotted against frequency. Curve 80 is referred to in the art as a power spectral density function of a controlled variable fluctuation. The coefficient λ represents the 3 db noise cutoff frequency for a process, a control loop thereof, or the particular controlled variable. Thus, a λ value is shown at line 82 and a second λ value is shown at line 84. When the operator adjusts λ he is in essence varying the value of a 3 db noise cutoff frequency for a controlled variable power spectrum; that is, he is moving it up or down on the frequency scale. Curve 80 is idealized; actually, when a new λ is chosen, the power spectrum may be altered above the cutoff frequency as noted by dotted line 86. A signal representing this change, or change in the value of λ, is provided as noted in the above description to tuner 34 so as to better tune the control algorithm coefficients.

FIG. 4 shows a graph of the information displayed, for example, on a recorder 46 of FIG. 1. Plotted in FIG. 4 is the magnitude of a manipulated variable signal present on line 12, for example, against time. Lines 90, 92 on FIG. 4 establish the upper and lower limits respectively of the controlled variable fluctuation. Curve 94 represents a desired range of the manipulated variable fluctuation whereas curve 96 indicates too great an amplitude of fluctuation and curve 98 indicates too little an amplitude of fluctuation. Translating this into control terms, curve 96 indicates that the controller 24 is overcontrolling; curve 98 indicates that controller 24 is under controlling. It is this type of display that the operator considers in adjusting the coefficient to be supplied to tuner 28. The operator inspects a recorder 46, for example, and attempts to adjust λ so that an amplitude range, such as for curve 94, is approached.

In summary then, the novel method of my invention comprises a method of process control wherein tuned coefficients for a controller are generated in response to identified process parameter values and a single process-related coefficient λ. Filtering can be employed with the novel method of my invention on the controlled variable signals. My invention can be applied to many different arrangements of controllers including cascaded controllers, parallel arranged controllers, and combinations of parallel-cascaded connected controllers. As noted before, it is also possible to extend this method so as to have a master-slave relationship between the λ coefficient for a plurality of control loops.

While the invention has been particularly shown and described with reference to a preferred embodiment thereof, it will be understood by those skilled in the art that the foregoing and other changes in form and details may be made therein without departing from the spirit and scope of the invention.

I claim:

1. In a method of process control requiring tuning of controller gain parameters for use with an existent process, wherein process parameter values of the process model equation representing said existent process have been identified and are provided as parameter value signals, said existent process having as a part of the means for accomplishing said process, a controller generating a control signal, said controller being responsive to gain control signals to establish said gains thereof, means for adjusting said controlling variable in response to said control signal, the improvement thereto comprising the steps of:

measuring process input variable, and providing measurement signals representative thereof;

providing an indication of the fluctuations of said manipulated process input variable for a discrete time period;

adjusting the process noise cutoff frequency (λ) until said indication of said manipulated input variable fluctuations are within a permissible range; and generating gain control signals to thereby control the values of said controller gain parameters in response to said adjustment in said process noise cutoff frequency and in response to said signals representing said identified process parameter values.

2. A method of process control for tuning of controller gain of the type set forth in claim 1 wherein said process model equation comprises:

$$\frac{y(s)}{x(s)} = Ke^{-s\tau}\frac{A}{s+A}$$

where:

$y(s)$ = said measured process output variables;
$x(s)$ = said measured process input variables;
$K$ = process gain;
$e$ = the natural logarithmic base;
$s$ = the Laplace symbol;
$\tau$ = process transport delay;
$A$ = a process pole value.

3. A method of process control for tuning of controller gain of the type set forth in claim 2 wherein said provision of parameter value signals representing said identified process parameter values to which said gain control generating signals are responsive include:

generating a signal representing parameter K, said process gain;
generating a signal representing parameter A, said process pole value; and
generating a signal representing parameter $\tau$, said process transport delay.

4. A method of process control for tuning of controller gain of the type set forth in claim 3 wherein said step of generating gain control signals to thereby control the values of said controller gain parameters includes the steps of:

generating a first gain control signal representing the value of the expression $-1+\lambda\tau$;
generating a second gain control signal representing the value of the expression $-\lambda T$;
generating a third gain control signal representing the value of the expression $\lambda/KA$; and
generating a fourth gain control signal representing the value of the expression $\lambda/KA(-1+AT)$ where:

$K$ = said process gain;
$A$ = said process pole value;
$\lambda$ = said process noise cutoff frequency;
$T$ = sampling interval chosen so that $$\frac{T}{2} \leq \tau < 1.5T$$

5. A method of process control for tuning of controller gain of the type set forth in claim 4 wherein said step of generating gain control signals comprises generating said four gain control signals and additionally comprises:

supplying said four gain control signals to said controller to thereby set said controller gain parameters, whereby said controller generates said process control signals by generating a plurality of error signals, each comprising the difference between one said measured process output variable and a preset setpoint value for that variable taken at said sampling intervals, and generating said process control signals according to the expression:

$$U_n = -b_1 U_{n-1} - b_2 U_{n-2} + a_0 E_n + a_1 E_{n-1}$$

where:

$b_1$ is represented by said first gain control signal;
$b_2$ is represented by said second gain control signal;
$a_0$ is represented by said third gain control signal;
$a_1$ is represented by said fourth gain control signal;
$U_n$ = the current value of said process control signal;
$E_n$ = the current value of said current error signal;
$E_{n-1}$ = said error signal immediately preceding in time said $E_n$ signal;
$U_{n-1}$ and $U_{n-2}$ = control signals prior in time to said current control signal.

References Cited

UNITED STATES PATENTS 2,712,414   7/1955   Ziebloz et al. _____ 235—151.1 X

OTHER REFERENCES

Kershow: "Adaptive Control by Plant Identification," Control Engineering, September 1965, pp. 103–110.

Ragazzini: "Sampled-Data Control Systems," McGraw-Hill, New York, 1958.

EUGENE G. BOTZ, Primary Examiner